United States Patent

Nishikuri et al.

Patent Number: 4,607,102
Date of Patent: Aug. 19, 1986

[54] DIOXAZINE FIBER REACTIVE COMPOUND

[75] Inventors: Masao Nishikuri, Hirakata; Takashi Omura, Ashiya; Akira Takeshita, Toyonaka, all of Japan

[73] Assignee: Sumitomo Chemical Company, Limited, Osaka, Japan

[21] Appl. No.: 573,317

[22] Filed: Jan. 24, 1984

[30] Foreign Application Priority Data

Feb. 4, 1983 [JP] Japan ............................ 58-17978

[51] Int. Cl.$^4$ ............... C07D 521/00; C07D 498/22
[52] U.S. Cl. .......................... 544/74; 8/543; 8/549
[58] Field of Search ........................ 544/99, 74

[56] References Cited

U.S. PATENT DOCUMENTS 3,223,470 12/1965 Boedeker et al. .............. 5/548
4,400,504 8/1983 Harms et al. .................. 544/74

FOREIGN PATENT DOCUMENTS 0095255 5/1982 European Pat. Off. ......... 544/99
0014654 6/1980 Japan ............................ 544/99
57-119955 7/1982 Japan ............................ 544/99

OTHER PUBLICATIONS

Japanese Application #119955/1982-Harms et al., EP 53,743, and Chem. Abstracts 97:217934.
Derwent Abstract: 50487 E/25-Bayer AG EP-53-743 6/16/82.

Primary Examiner—Richard L. Raymond
Assistant Examiner—D. I. Dinner
Attorney, Agent, or Firm—Stevens, Davis, Miller & Mosher; Stevens, Davis, Miller & Mosher

[57] ABSTRACT

A compound which is represented by a free acid of the following formula,

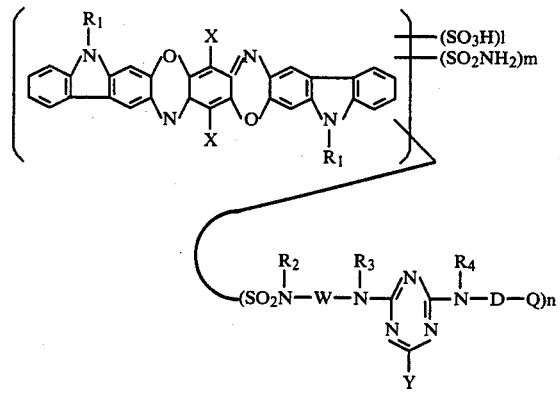

wherein X is hydrogen, halogen, alkyl or cyano, $R_1$, $R_2$ and $R_3$ are independently hydrogen or alkyl, $R_4$ is alkyl, W is alkylene, cycloalkylene or arylene, Q is $-SO_2CH=CH_2$ or $-SO_2CH_2CH_2L$ in which L is a group capable of being splitted by the action of an alkali, D is a benzene or naphthalene ring, l and m are independently a number of not less than 0 but not more than 3, and n is a number of more than 0 but not more than 3, provided that l, m and n satisfy $0 < l+m+n \leq 4$, and which is useful for dyeing fiber materials a blue color with a good build-up property to give a dyed product having excellent fastness properties.

4 Claims, No Drawings

DIOXAZINE FIBER REACTIVE COMPOUND

The present invention relates to a dioxazine compound, a method for producing the same and a method for dyeing fiber materials by using the same.

More specifically, the present invention relates to a dioxazine compound having two fiber-reactive groups different from each other, a method for producing the same, and a method for dyeing fiber materials in a blue color by using the same as a fiber-reactive dye.

Dioxazine reactive dyes having a monohalogenotriazinyl group, sulfatoethylsulfonyl group of the like are known, and almost all of them are of a tripheno type. However, reactive dyes of this type are not sufficient to meet with the requirements for dye performances such as dyeing velocity and level dyeing and build-up properties as well as fastness properties.

Recently, dioxazine reactive dyes of a carbazol type have been developed to improve the dye performances. For example, Published Unexamined Japanese Patent Application No. 119955/1982 discloses a reactive dye of the following formula,

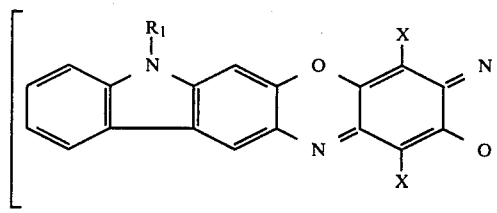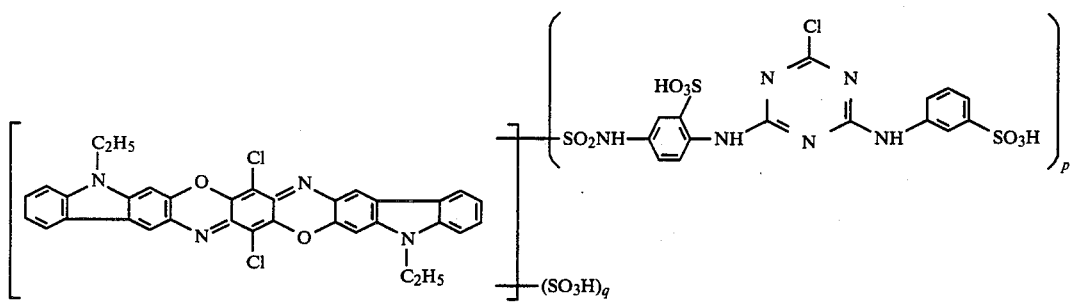

wherein p and q are independently a number of up to 1, provided that the sum of p and q is 2, which is, however, still insufficient in dye performances such as fixing efficiency, level dyeing property, temperature reliability, acid hydrolysis resistance and the like.

The present inventors have undertaken extensive studies to improve the dye performances of carbazol type dioxazine reactive dyes, and found the fact that reactive dyes of this type can be modified by linking the mono-halogenotriazinyl group with an aromatic group having a vinylsulfone type fiber-reactive group through an alkyl-substituted amino group, whereby the dye performances can be markedly improved.

The present invention provides a dioxazine compound represented by a free acid of Formula (I),

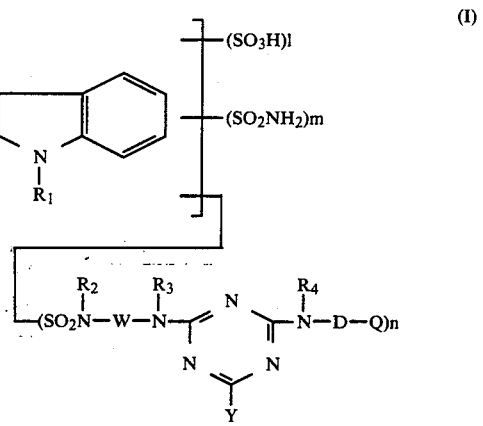

wherein X is a hydrogen or halogen atom or a lower alkyl or cyano group, $R_1$, $R_2$ and $R_3$ are independently a hydrogen atom or an unsubstituted or substituted lower alkyl group, $R_4$ is an unsubstituted or substituted lower alkyl group, W is an alkylene, cycloalkylene or arylene group, the alkylene being a $C_2$ to $C_6$ alkylene which is unsubstituted or substituted with a hydroxyl, sulfo ($SO_3H$) or sulfato ($OSO_3H$) group, and which is not or is interrupted by an oxygen or sulfur atom, the cycloalkylene is a $C_3$ to $C_6$ cycloalkylene, and the arylene is a 1,2-, 1,3- or 1,4-phenylene which is unsubstituted or substituted with a halogen atom or a lower alkyl, lower alkoxy, sulfo or carboxyl group, Y is a halogen atom, Q is a group of $-SO_2CH=CH_2$ or $-SO_2CH_2CH_2L$ in which L is a group capable of being splitted by the action of alkali, D is an unsubstituted or substituted benzene or naphthalene ring, l and m are independently a number of not less than 0 but not more than 3 ($0 \leq l \leq 3$, $0 \leq m \leq 3$), and n is a number of more than 0 but not more than 3 ($0 < n \leq 3$), provided that l, m and n satisfy $0 < l+m+n \leq 4$, and also provides a process for producing the dioxazine compound of Formula (I), which comprises reacting a 1,3,5-trihalogeno-s-triazine with a compound of Formula (II),

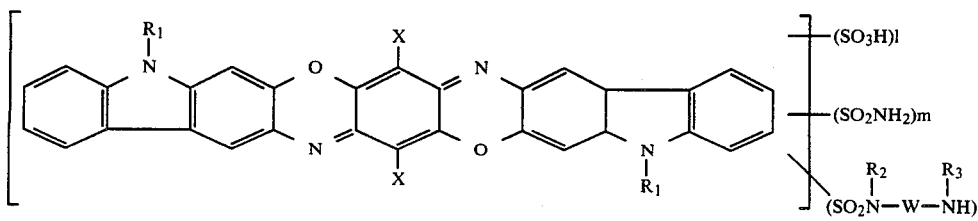

wherein X, $R_1$, $R_2$, $R_3$, W, l, m and n are as defined above, and an aromatic amine of Formula (III),

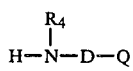

wherein $R_4$, D and Q are as defined above, in an optional order.

Further, the present invention provides a process for dyeing fiber materials, which comprises contacting the fiber materials with the dioxazine compound of Formula (I).

In the present invention, the lower alkyl group represented by $R_1$, $R_2$, $R_3$ and $R_4$ in Formula (I) includes, for example, $C_1$ to $C_4$ alkyl groups such as methyl, ethyl, propyl and butyl, and the substituent of the lower alkyl group includes, for example, hydroxyl, carboxyl, sulfo, carbamoyl, cyano and methoxycarbonyl.

Preferred $R_4$ is methyl, ethyl, 2-carbamoylethyl, 2-hydroxyethyl, 2-carboethyl and n- or iso-propyl.

The alkylene group represented by W includes, for example, $C_2$ to $C_6$ straight alkylene such as ethylene, 1,2- or 1,3-propylene, 1,2-, 1,3-, 1,4- or 2,3-butylene 1,5-pentylene or 1,6-hexylene, and others such as 2,2-dimethylpropylene, 2-hydroxy-1,3-propylene, —CH$_2$—CH$_2$—O—CH$_2$—CH$_2$— and —CH$_2$—CH$_2$—S—CH$_2$—CH$_2$—. The phenylene group also represented by W includes, for example, 2-methyl-1,3-phenylene, 2-methyl-1,4-phenylene, 3-methyl-1,2-phenylene, 4-methyl-1,2-phenylene, 4-chloro-1,3-phenylene, 4-sulfo-1,3-phenylene, 4-sulfo-1,2-phenylene, 2-sulfo-1,4-phenylene, 2,5-disulfo-1,4-phenylene, 2-carboxy-1,4-phenylene, 4-methoxy-1,3-phenylene and 2-methoxy-1,4-phenylene. The cycloalkylene includes, for example,

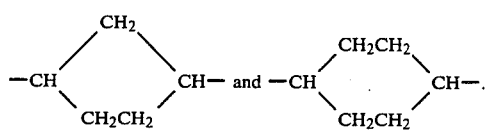

The substituent of the benzene or naphthalene ring represented by D includes, for example, $C_1$ to $C_4$ alkyl (preferably methyl and ethyl), $C_1$ to $C_4$ alkoxy (preferably methoxy and ethoxy), halogen (preferably chlorine and bromine), nitro, sulfo and carboxyl.

The group capable of being splitted by the action of an alkali represented by L in the formula of —SO$_2$CH$_2$CH$_2$L includes, for example, halogens such as chlorine and bromine, carboxylic and sulfonic ester groups such as lower alkanoyloxy including acetyloxy, benzoyloxy, benzenesulfonyloxy and group represented by a free acid of the formula, —OPO$_3$H$_2$, —SSO$_3$H or —OSO$_3$H. Of these, preferred is —OSO$_3$H. Thus, preferred Q is —SO$_2$CH$_2$CH$_2$OSO$_3$H, in which —SO$_2$CH=CH$_2$ may be contained.

The dioxazine compound (I) of the present invention is in general a mixture of two or more, in other words, l, m and n in Formula (I) are independently an average number. However, it is natural that the dioxazine compound (I) may be a single compound, in other words, l, m and n may be independently an integer.

Among the dioxazine compounds (I), a preferred compound is represented by a free acid of the following formula,

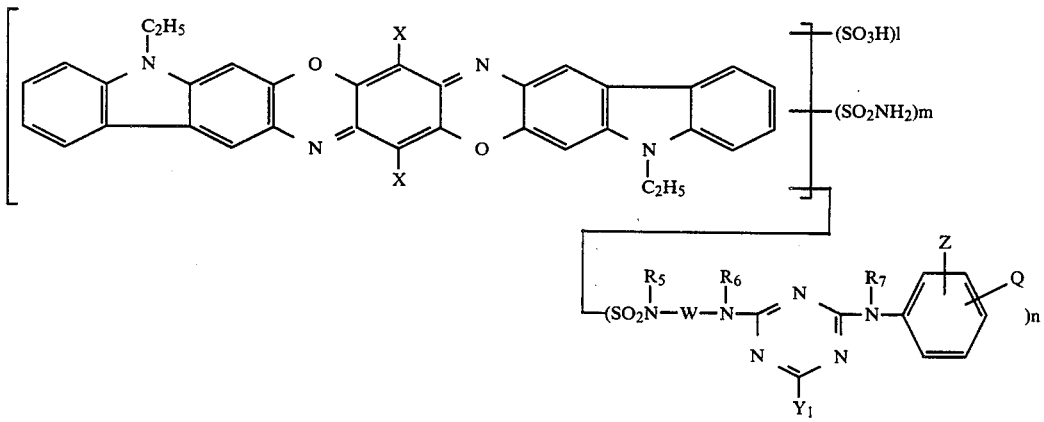

wherein X, W, Q, l, m and n are as defined above, $R_5$ and $R_6$ are independently a hydrogen atom or a methyl or ethyl group, $R_7$ is a methyl, ethyl, 2-carbamoylethyl, 2-hydroxyethyl, 2-carboethyl or n- or iso-propyl group, $Y_1$ is a fluorine or chlorine atom, and Z is a hydrogen, chlorine or bromine atom or a methyl, ethyl, methoxy, ethoxy, nitro, sulfo or carboxyl group. Of these, more preferable compound is represented by a free acid of the following formula,

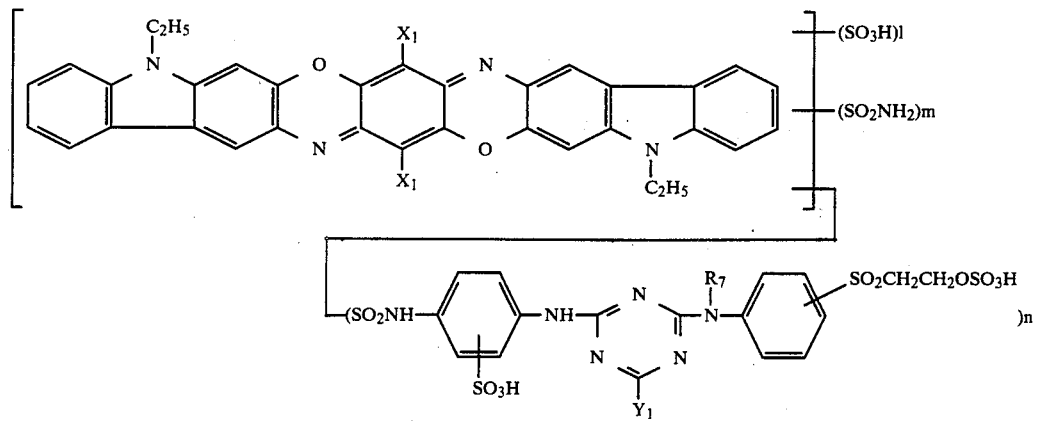

wherein $R_7$, $Y_1$, l, m and n are as defined above, and $X_1$ is a hydrogen or halogen atom or a methyl, ethyl or cyano group, or of the following formula,

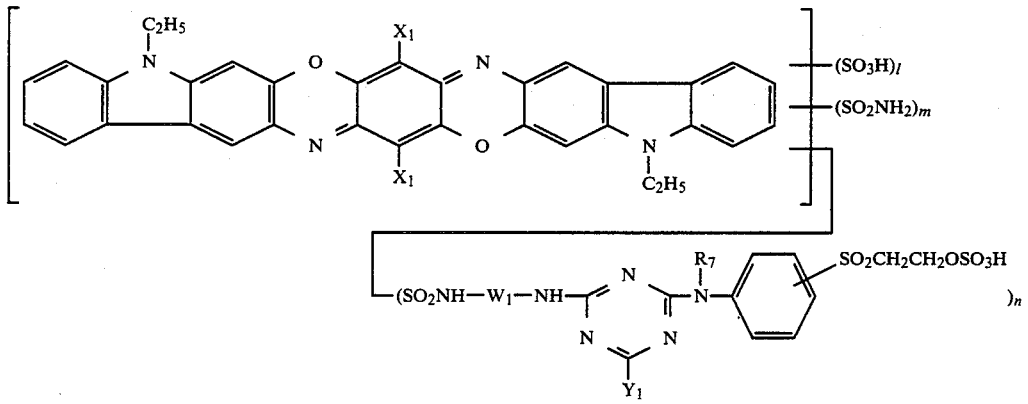

wherein $R_7$, $X_1$, $Y_1$, l, m and n are as defined above, and $W_1$ is a $C_2$ to $C_6$ straight alkylene or

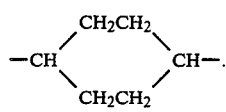

The dioxazine compound (I) of the present invention is preferably in the form of alkali metal or alkaline earth metal salts, preferably sodium or potassium salt. These salts can be obtained as desired by selecting the kind of starting compounds, alkali agents to be used for the neutralization of acid produced during the dioxazine compound production steps, or electrolytes to be used when the desired compound is, if desired, isolated by salting-out.

In the production of dioxazine compound (I), the starting compound (II) can be produced by reacting a compound of Formula (IV),

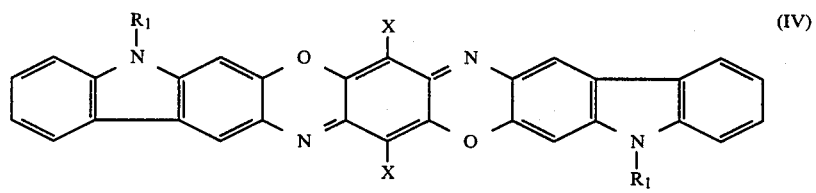

wherein X and $R_1$ are as defined above, with chlorosulfonic acid to obtain a corresponding chlorosulfonyl compound, and then reacting the chlorosulfonyl compound with a diamine of Formula (V), $$R_2HN-W-NHR_3 \qquad (V)$$

wherein $R_2$ and $R_3$ are as defined above, in the presence or absence of ammonia.

Another starting compound, the aromatic amine of Formula (III), can be prepared by reacting a primary aromatic amine of Formula (VI),

$$H_2N-D-Q \qquad (VI)$$

wherein D and Q are as defined above, with an alkylating agent, or reacting a precursor compound of Formula (VII),

$$H_2N-D-SO_2CH_2CH_2OH \qquad (VII)$$

wherein D is as defined above, with an alkylating agent, followed by esterification or halogenation in a conventional manner.

The alkylating agent can be selected from alkyl halides, dialkylsulfuric acids, 1-substituted ethylenes and oxides, as desired for $R_4$ in Formula (III).

Examples of the aromatic amine compounds (VI) are as follows:
1-Aminobenzene-2,3- or 4-β-sulfatoethylsulfone
1-Aminobenzene-3-phosphatoethylsulfone
1-Amino-4-methylbenzene-3-β-sulfatoethylsulfone
1-Aminobenzene-3-β-chloroethylsulfone
1-Amino-4-methoxybenzene-3-β-sulfatoethylsulfone
1-Amino-2,5-dimethoxybenzene-4-β-sulfatoethylsulfone
1-Amino-2-methoxybenzene-4-β-sulfatoethylsulfone
1-Amino-2-chlorobenzene-4-β-sulfatoethylsulfone
1-Amino-2-methoxybenzene-5-β-sulfatoethylsulfone
2-Aminonaphthalene-8-β-sulfatoethylsulfone
2-Aminonaphthalene-8-β-sulfatoethylsulfone-6-sulfonic acid
1-Amino-2,5-dimethoxybenzene-4-vinylsulfone
1-Amino-2-methoxy-5-methylbenzene-4-β-sulfatoethylsulfone
2-Aminonaphthalene-4-, 5, 6- or 7-β-sulfatoethylsulfone
1-Amino-2-bromobenzene-4-β-sulfatoethylsulfone
1-Amino-2-bromobenzene-4-vinylsulfone
2-Amino-8-sulfonaphthalene-6-β-sulfatoethylsulfone
2-Aminonaphthalene-8-β-phosphatoetylsulfone-6-sulfonic acid
2-Aminonaphthalene-8-vinylsulfone-6-sulfonic acid
1-Amino-2-methoxy-5-methylbenzene-4-β-chloroethylsulfone
1-Aminobenzene-2-, 3- or 4-vinylsulfone
1-Amino-2-methoxy-5-chlorobenzene-4-β-sulfatoethylsulfone or -4-vinylsulfone
1-Amino-2-ethoxy-5-chlorobenzene-4-β-sulfatoethylsulfone or -4-vinylsulfone
2-Aminonaphthalene-6-β-sulfatoethylsulfone-1-sulfonic acid
5-Chloroaniline-2-β-sulfatoethylsulfone
5-Sulfoaniline-2-β-sulfatoethylsulfone
Aniline-2-β-thiosulfatoethylsulfone
5-Chloroaniline-2-β-thiosulfatoethylsulfone
5-Sulfoaniline-2-β-thiosulfatoethylsulfone
Aniline-2-β-phosphatoethylsulfone
5-Chloroaniline-2-β-phosphatoethylsulfone
5-Sulfoaniline-2-β-phosphatoethylsulfone
5-Chloroaniline-2-vinylsulfone
5-Sulfoaniline-2-vinylsulfone
Aniline-2-β-chloroethylsulfone
5-Chloroaniline-2-β-chloroethylsulfone
5-Sulfoaniline-2-β-chloroethylsulfone All the starting compounds described above may be used in the form of acid or salts, particularly alkali metal salts or alkaline earth metal salts.

In the condensation reaction of the compound (II) and the aromatic amine (III) with 1,3,5-trihalogeno-s-triazine, the order and conditions of the condensation reaction are not particularly limited. Generally speaking, the reaction can be carried out at a pH ranging from 2 to 8, preferably from 3 to 6, and at a temperature ranging from about −10° to 50° C. Considering the yield and quality of the dioxazine compound (I), it is preferred to carry out the first condensation of 1,3,5-trihalogeno-s-triazine with any of the compound (IV) or the aromatic amine (V), which has a lower reactivity with 1,3,5-trihalogeno-s-triazine, followed by second condensation with the remaining one. Although the reaction conditions vary depending on the stability of the starting compound and intermediate product, the first condensation can be carried out at a relatively low pH ranging from 3 to 4 and at a relatively low temperature ranging from −5° to 10° C. The conditions of the second condensation also vary depending on the stability of the starting compound, intermediate compound and final product, but in usual, the second condensation can be carried out at a relatively high pH ranging from 4 to 6 and at a relative high temperature ranging from 30° to 40° C.

The dioxazine compound produced in accordance with the present invention may be in a liquid form obtained by removing inorganic salts or adding a dyeing improver, if necessary, after completion of the reaction, or may be formed into a powdery product by subjecting the above liquid or the reaction mixture as such to evaporation i.e. spray-drying and the like, or into either liquid or powdery product through salting out of the desired compound in a conventional manner using an electrolyte.

The dioxazine compound of Formula (I) having two kinds of fiber reactive groups may be used as a reactive dye for dyeing hydroxyl group-, or amido group-containing materials.

The hydroxyl group-containing materials include natural or synthetic hydroxyl group-containing fiber materials such as cellulose fiber materials, regenerated products thereof and polyvinyl alcohol. Examples of the cellulose fiber materials are cotton and other vegetable fibers such as linen, hemp, jute and ramie fibers. Examples of the regenerated cellulose fibers are viscose staple and filament viscose.

The amide group-containing materials include synthetic or natural polyamide and polyurethane. Examples of the materials, particularly in the fibrous forms, are wool and other animal furs, silk, leather, polyamide-6,6, polyamide-6, polyamide-11 and polyamide-4.

The dyeing may be carried out in a manner suitable for the reactive groups appended to the fiber-reactive dye.

For example, in the case of dyeing cellulose fiber materials, the dyeing may be carried out by an exhaustion dyeing, printing, padding including cold-padbatch-up method or the like, from which a suitable one may be chosen depending on the property and physical form of the fibers. In these methods, an acid-binding agent such as sodium hydroxide, sodium carbonate, sodium bicarbonate, phosphates, silicates and the like may be used together with the dioxazine compound of Formula (I).

More concretely speaking, the exhaustion dyeing may be carried out at a relatively low temperature using a dye bath containing sodium hydroxide or other acid-binding agents, and sodium sulfate or sodium chloride. The printing may be carried out by preparing a dye paste containing a paste or emulsified paste such as sodium alginate and starch ether, alkalis or alkali-liberating agents such as sodium carbonate, sodium bicarbonate, sodium hydroxide, trisodium phosphate, sodium trichloroacetate and the corresponding potassium or alkaline earth metal salts, and if desired, a conventional printing assistant such as urea, and a dispersing agent, applying the dye paste on the fiber, drying and then heat-treating the printed fiber using steam. The cold-pad-butch-up method may be carried out by applying a padding solution to the fiber at ambient temperature, the padding solution comprising an acid-binding agent such as sodium hydroxide alone or a mixture of sodium hydroxide and sodium silicate, sodium carbonate or trisodium phosphate, and if necessary, a dissolving assistant such as urea, and a penetrant, batching up the fiber with a roll, allowing to stand for 3 hours or more, or overnight, and then rinsing and drying to obtain a dyed product.

The dioxazine compound of the present invention can give remarkable advantages in the dyeing of fiber materials. Particularly when used for dyeing cellulose fiber materials, the present compounds can exhibit excellent build-up and level-dyeing properties and give a dyed product excellent in light fastness, perspiration-light fastness, abrasion fastness, wet fastness such as washing resistance, chlorine-containing water resistance, chlorine-bleaching resistance, alkali resistance, perspiration resistance and peroxide-washing resistance, acid-hydrolysis fastness and iron fastness.

Moreover, the dioxazine compound of the present invention can give a dyed product constant in the quality irrespective of change in the dyeing temperature, and exhibit high exhaustion and fixation percentages, and an improved solubility in water and an alkali-containing water.

It is noted that the dioxazine compound of the present invention are superior to that having hydrogen as $R_4$ in Formula (I), particularly in solubility in water and an alkali-containing water as well as fixing efficiency and build-up property.

The present invention is illustrated in more detail with reference to the following Examples, which are only illustrative of the present invention. In Examples, parts are by weight, unless otherwise specified.

EXAMPLE 1

A dioxazine compound (20 parts) of the following formula,

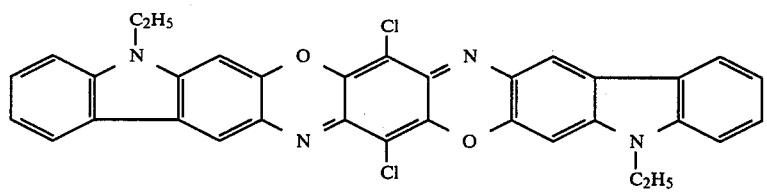

was added to chlorosulfonic acid (100 parts). The mixture was allowed to react for 2 hours at ambient temperature, and thionyl chloride (10 parts) was added thereto. One hour thereafter, the reaction mixture was poured into a mixture of ice water (100 parts by volume) and hydrochloric acid (100 parts by volume), and then subjected to filtration and washing. The resulting wet cake was mixed with 2,5-diaminobenzenesulfonic acid (14.7 parts) in water, and the mixture was allowed to react, while keeping the pH to between 7 and 8. After completion of the reaction, sodium chloride was added to the reaction mixture to precipitate the reaction product, which was then collected on a filter.

The reaction product was mixed with cyanuric chloride (12.7 parts) in water, and the mixture was allowed to react at a temperature of between 0° and 5° C. and at a pH of between 4 and 5. Then, N-ethyl-3-β-sulfatoethylsulfonylaniline (21 parts) was added thereto, and the reaction was continued at a temperature of between 30° to 40° C. and at a pH of between 6 and 7. After completion the reaction, sodium chloride was added thereto to precipitate the reaction product. The product was collected on a filter, washed and then dried at a temperature of 60° C. to obtain a dioxazine compound represented by a free acid of the following formula.

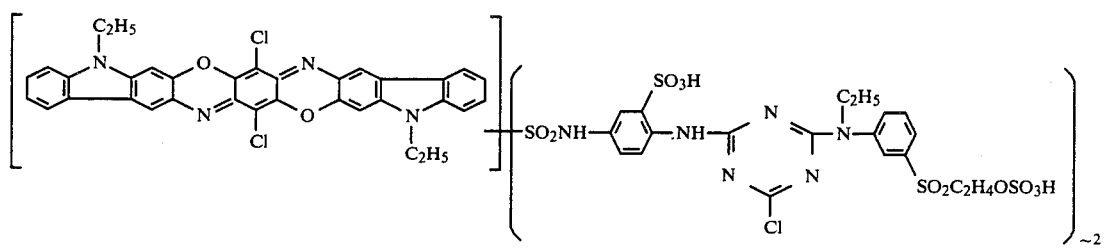

λmax 573, 630 nm (water)

DYEING EXAMPLE 1

The compound obtained in Example 1 (each 0.1, 0.3 and 0.6 part) was dissolved in water (200 parts), respectively, and the sodium sulfate (10 parts) was added thereto to prepare each dye bath, cotton (10 parts) was dipped into the dye bath, and the bath was heated to a temperature of 85° C. Then, sodium carbonate (4 parts) was added to the bath, and the dyeing was continued for 1 hour. The cotton was washed with water, soaped, again washed with water and then dried. Thus, a dyed product of a brilliant blue color having excellent fastness properties, particularly fastness to light, perspiration-light and chlorine, and excellent build-up property was obtained.

It was also found that the compound of Example 1 was excellent in solubility, level dyeing property and reproducibility of dyeings.

EXAMPLE 2

A dioxazine compound (20 parts) of the following formula, and the mixture is allowed to react, while keeping the pH to between 7 and 8. Thereafter, the mixture is further kept for 2 hours at a temperature of 80° C. and at a pH of 10. Sodium chloride is added to the reaction mixture to precipitate the reaction product. The product separated by filtration is mixed with cyanuric chloride (6.2 parts) in water, and the mixture is allowed to react at a temperature of between 0° and 5° C. and at a pH of between 4 and 5. Then, N-ethyl-3-β-sulfatoethyl-sulfonylaniline (10 parts) is added thereto, and the reaction is continued at a temperature of between 30° and 40° C. and at a pH of between 6 and 7. After completion of the reaction, sodium chloride is added thereto to precipitate the reaction product. Thus, a compound represented by a free acid of the following formula,

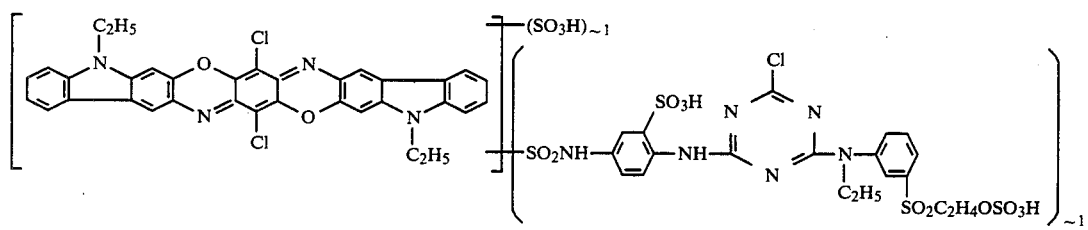

is obtained.

The compound can exhibit an excellent built-up property and solubility, and is capable of dyeing cellose fibers a blue color.

EXAMPLES 3 TO 15

Example 1 is repeated, provided that cyanuric fluoride is used in place of cyanuric chloride. Thus, a com-

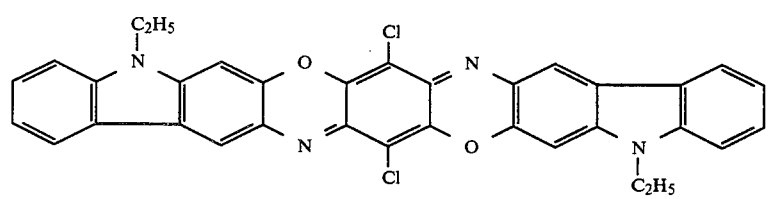

is subjected to sulfochlorination in the same manner as in Example 1. The resulting wet cake is mixed with 2,5-diaminobenzenesulfonic acid (7.2 parts) in water, pound represented by a free acid of the following formula,

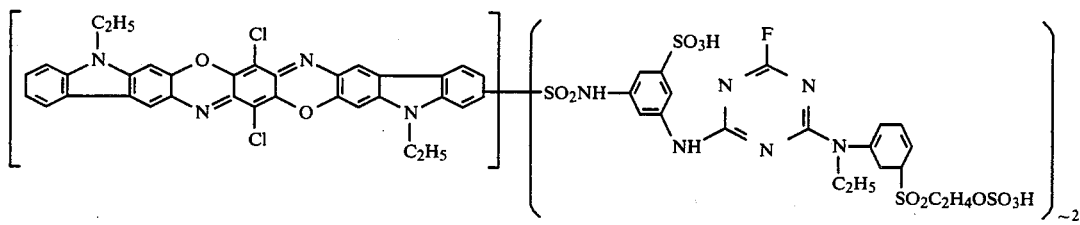

is obtained.

The compound can exhibit an excellent build-up property and solubility, and is capable of dyeing cellulose fibers a blue color.

In a manner similar to that of Example 1 or 2, each compound as shown in Column II of Table 1 is obtained, and then allowed to react with both reactants as shown in Column III, thereby obtaining each compound capable of dyeing or printing cellulose fibers a blue color. The compound can exhibit an excellent solubility and build-up property, and give a dyed or printed product of high fastness.

TABLE 1
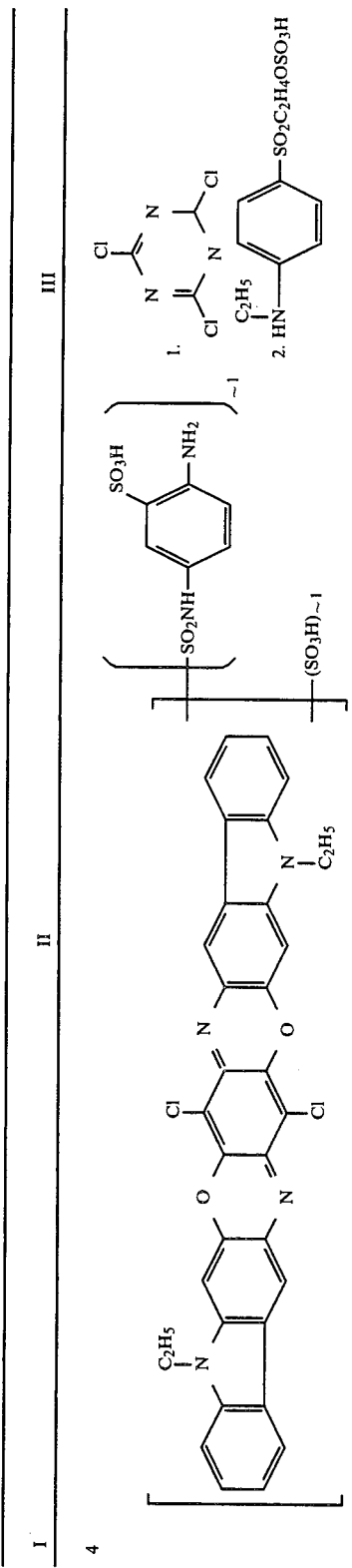
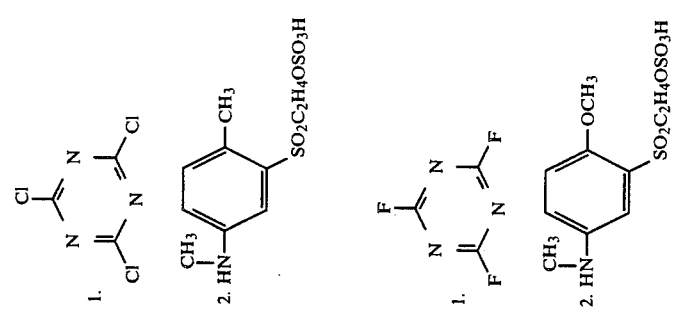

4,607,102
TABLE 1-continued
| I | II | | III |
|---|---|---|---|
| 7 | 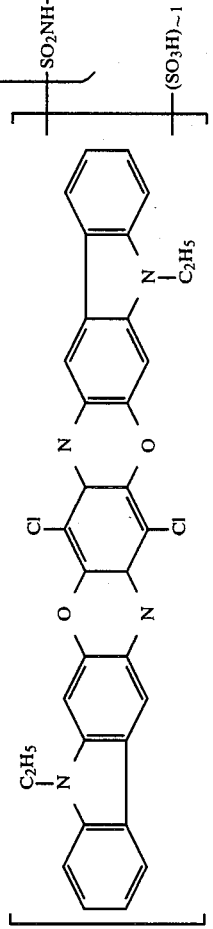 | 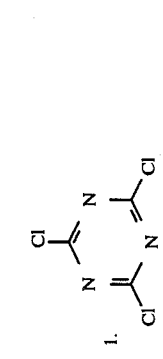 | 1. 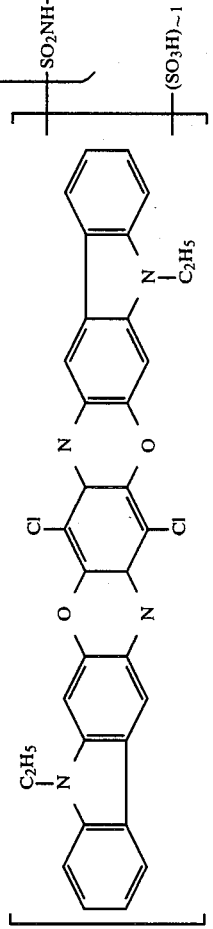 2. 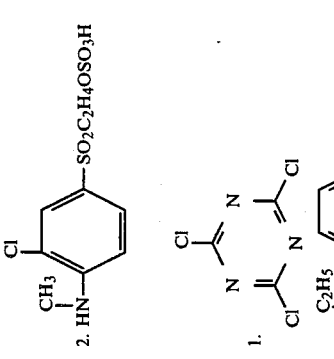 |
| 8 | " | | 1. 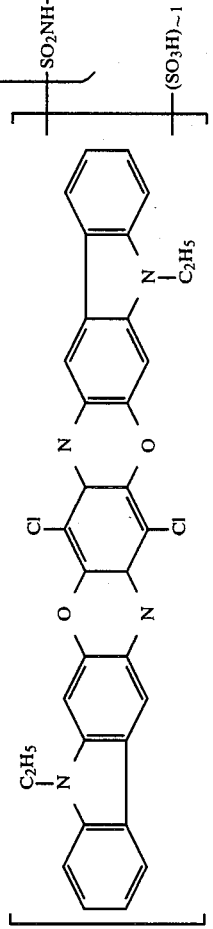 2. 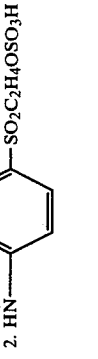 |
| 9 | 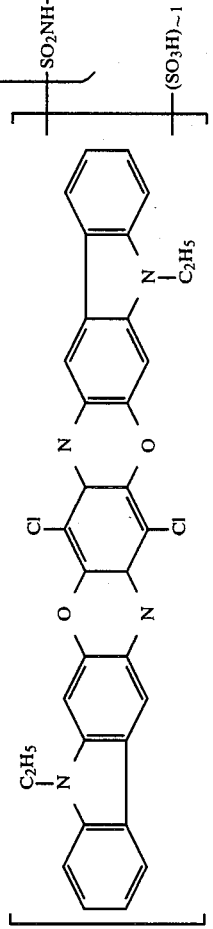 | 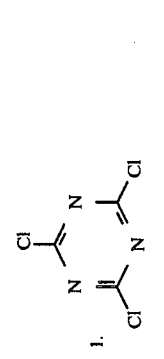 | 1. (same cyanuric chloride) 2. (same aniline derivative) |
| 10 | " | | 1. cyanuric chloride |

TABLE 1-continued
| I | II | III |
|---|---|---|
| 11 | | 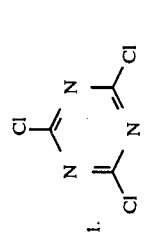 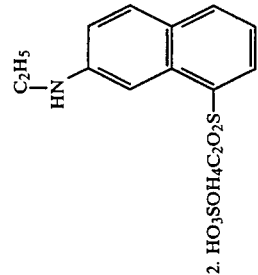 |
| 12 | 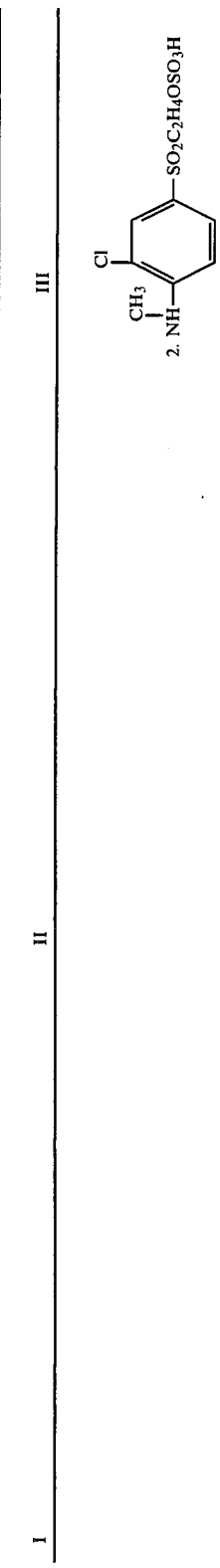 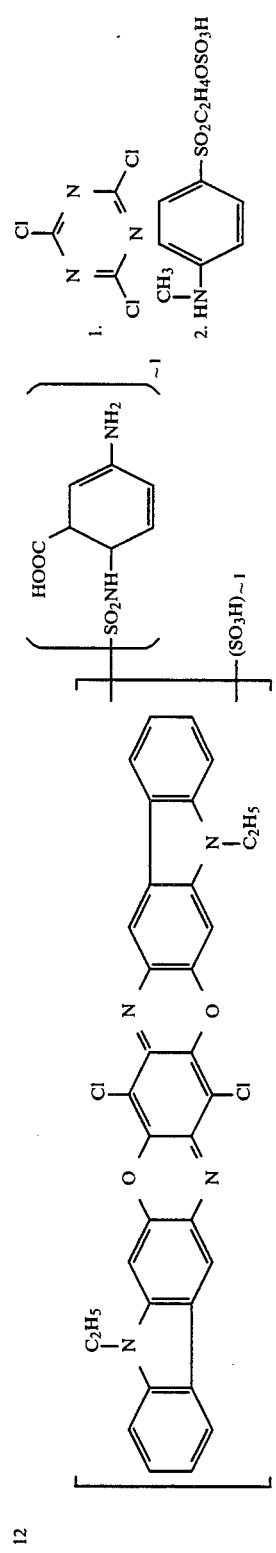 |   |

TABLE 1-continued

EXAMPLE 16

A mixture of a dioxazine compound (20 parts) of the following formula,

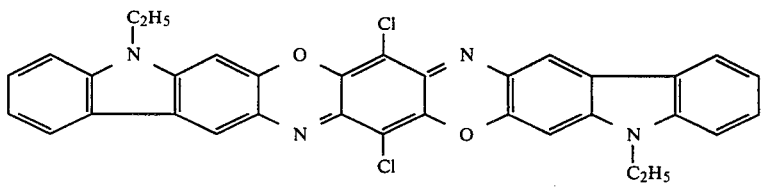

and chlorosulfonic acid (150 parts) was allowed to react for 5 hours at 100° C., then cooled to ambient temperature and poured into ice water. Sodium chloride (40 parts) was added thereto to precipitate the reaction product.

The resulting wet cake was added into ice water (200 ml), and 25% aqueous ammonia (2.3 parts) and ethylenediamine monoacetate (3.5 parts) were added thereto. The mixture was allowed to react for 20 hours at ambient temperature at a pH of between 10 and 11. Thereafter, sodium hydroxide (20 parts) was added thereto, and the reaction was continued for 2 hours at 90° C. After cooling, the reaction mixture was adjusted to a pH of between 7 and 8 using hydrochloric acid, and then allowed to react with cyanuric chloride (6 parts) at a temperature of between 0° and 5° C. Successively, N-ethyl-3-β-sulfatoethylsulfonylaniline (10.5 parts) was added thereto, and the mixture was allowed to react at a pH of between 5 and 6 at 40° C. Sodium chloride was

EXAMPLE 17

Cyanuric chloride (12.5 parts) was dispersed in ice water (100 parts) containing a nonionic surfactant (0.2 part), and N-methyl-4-β-sulfatoethylsulfonylaniline (20 parts) was added thereto. The mixture was allowed to react at a temperature of between 0° and 5° C. and at a pH of between 4 and 5, thereby forming a triazine compound.

On the other hand, a sulfochlorination compound of dioxazine which had been produced in the same manner as in Example 1, and ethylenediamine monoacetate (7 parts) were allowed to react at ambient temperature for 20 hours at pH 10, and then sodium hydroxide was added thereto. The mixture was further kept at 90° C. for 2 hours.

The resulting reaction mixture was mixed with the triazine compound obtained above, and the mixture was allowed to react at a temperature of between 30° and 40° C. and at a pH of between 6 and 7. After completion of the reaction, sodium chloride was added thereto to separate a compound represented by a free acid of the following formula.

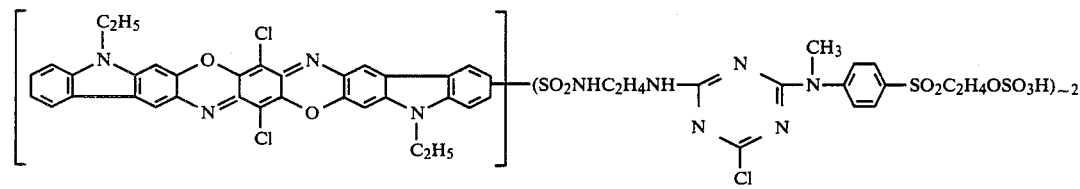

added thereto to precipitate the reaction product. Thus, a compound represented by a free acid of the following formula,

EXAMPLES 18 TO 21

In a manner similar to that of Example 16, the com-

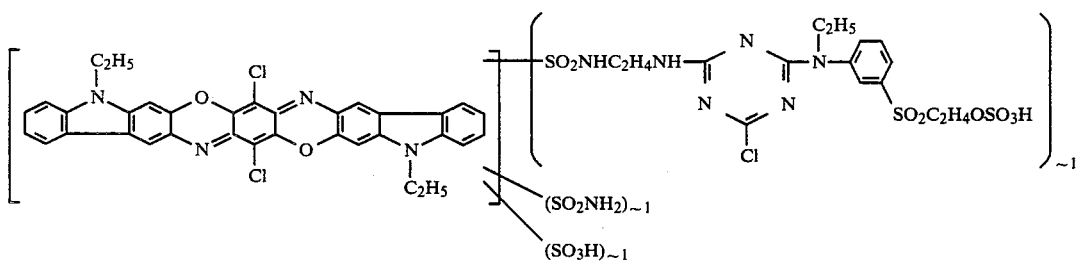

was obtained.

The compound exhibited excellent solubility and build-up property, and was able to dye and print cellulose fibers to obtained a dyed product of a blue color having high fastness.

pound as shown in Column II of Table 2 is allowed to react with the compound as shown in Column III, obtaining the corresponding dioxazine compound capable of dyeing or printing cellulose fibers a blue color. The dioxazine compound can exhibit an excellent solubility and build-up property, and can give a dyed or printed product of high fastness.

TABLE 2
| I | II |
|---|---|
| 18 | 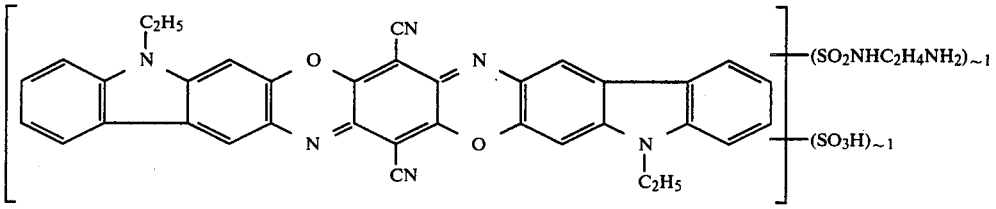 —(SO₂NHC₂H₄NH₂)~1  —(SO₃H)~1 |
| 19 | 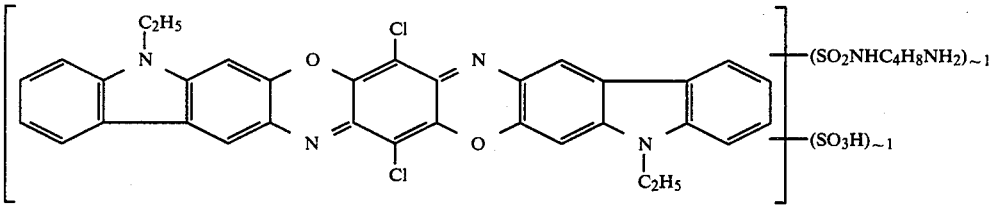 —(SO₂NHC₄H₈NH₂)~1  —(SO₃H)~1 |
| 20 | 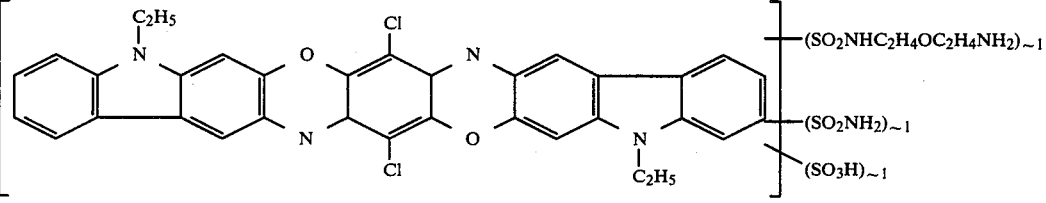 —(SO₂NHC₂H₄OC₂H₄NH₂)~1  —(SO₂NH₂)~1  —(SO₃H)~1 |
| 21 | 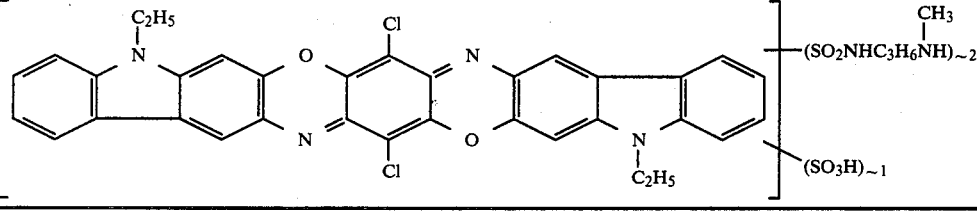 —(SO₂NHC₃H₆NH—CH₃)~2  —(SO₃H)~1 |
| I | III |
|---|---|
| 18 | 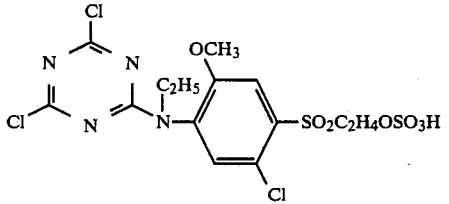 |
| 19 | 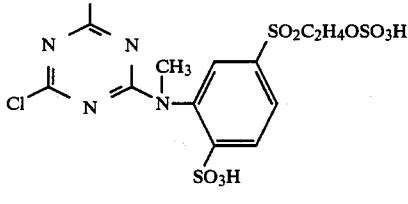 |
| 20 | 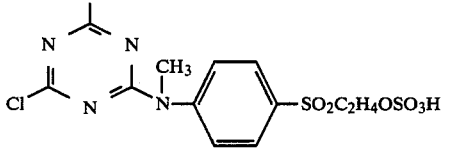 |

TABLE 2-continued

21 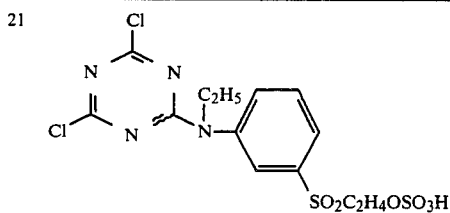

What is claimed is:

1. A compound represented by a free acid of the following formula,

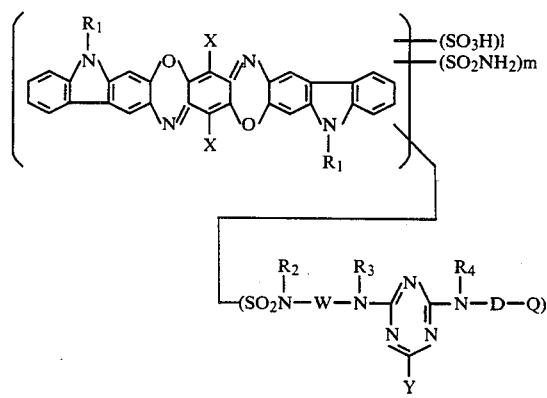

wherein X is a hydrogen or halogen atom or a lower alkyl or cyano group, $R_1$, $R_2$ and $R_3$ are independently a hydrogen atom or a lower alkyl group unsubstituted or substituted with a substituent selected from the group consisting of hydroxyl, carboxyl, sulfo, carbamoyl, cyano or methoxycarbonyl, $R_4$ is a lower alkyl group unsubstituted or substituted with a substituent selected from the group consisting of hydroxyl, carboxyl, sulfo, carbamoyl, cyano or methoxycarbonyl, W is an alkylene, cycloalkylene or arylene group, the alkylene being a $C_2$ to $C_6$ alkylene which is unsubstituted or substituted with a hydroxyl, sulfo or sulfate group, and which is not or is interrupted by an oxygen or sulfur atom, the cycloalkylene is a $C_3$ to $C_6$ cycloalkylene, and the arylene is a 1,2-, 1,3- or 1,4-phenylene which is unsubstituted or substituted with a halogen atom or a lower alkyl, lower alkoxy, sulfo or carboxyl group, Y is a halogen atom, Q is a group of —$SO_2CH=CH_2$ or —$SO_2CH_2CH_2L$ in which L is a group capable of being split by the action of alkali, D is an unsubstituted or substituted benzene or naphthalene ring, l and m are independently a number of not less than 0 but not more than 3, and n is a number of more than 0 but not more than 3, provided that l, m and n satisfy $0<l+m+n+\leq 4$.

2. A compound represented by a free acid of the following formula,

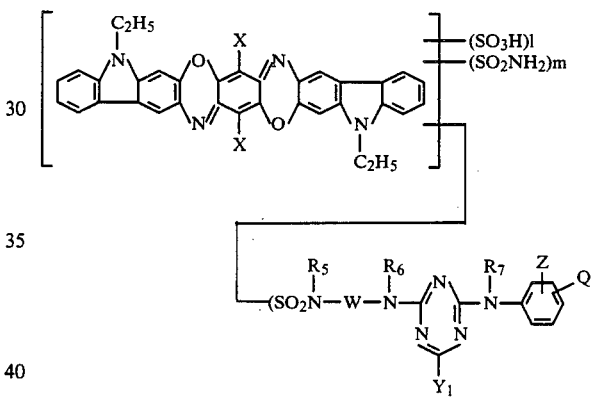

wherein X is a hydrogen or halogen atom or a lower alkyl or cyano group, $R_5$ and $R_6$ are independently a hydrogen atom or a methyl or ethyl group, $R_7$ is a methyl, ethyl, 2-carbamoylethyl, 2-hydroxyethyl, 2-carboethyl or n- or iso-propyl group, W is an alkylene, cycloalkylene or arylene group, the alkylene being a $C_2$ to $C_6$ alkylene which is unsubstituted or substituted with a hydroxyl, sulfo or sulfato group, and which is not or is interrupted by an oxygen or sulfur atom, the cycloalkylene is a $C_3$ to $C_6$ cycloalkylene, and the arylene is a 1,2-, 1,3- or 1,4-phenylene which is unsubstituted or substituted with a halogen atom or a lower alkyl, lower alkoxy, sulfo or carboxyl group, $Y_1$ is a fluorine or chlorine atom, Z is a hydrogen, chlorine or bromine atom or a methyl, ethyl, methoxy, ethoxy, nitro, sulfo or carboxyl group, Q is a group of —$SO_2CH=CH_2$ or —$SO_2CH_2CH_2L$ in which L is a group capable of being split by the action of an alkali, l and m are independently a number of not less than 0 but not more than 3, n is a number of more than 0 but not more than 3, provided that l, m and n satisfy $0<l+m+n\leq 4$.

3. A compound represented by a free acid of the following formula,

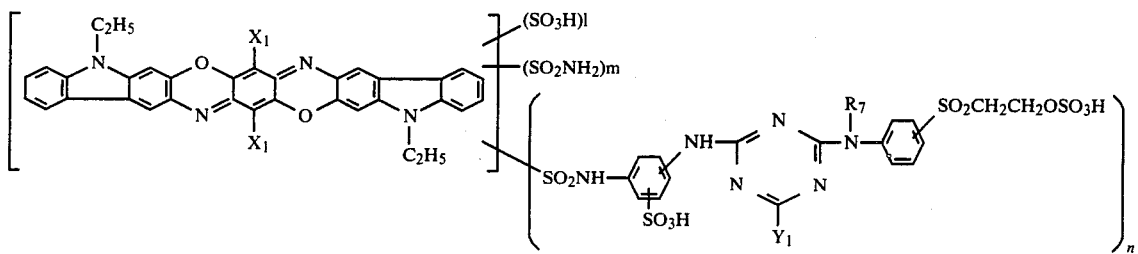

wherein $X_1$ is a hydrogen or halogen atom or a methyl, ethyl or cyano group, $R_7$ is a methyl, ethyl, 2-carbamoylethyl, 2-hydroxyethyl, 2-carboethyl or n- or iso-propyl group, $Y_1$ is a fluorine or chlorine atom, l and m are independently a number of not less than 0 but not more than 3, and n is a number of more than 0 but not more than 3, provided that l, m and n satisfy $0 < l+m+n \leqq 4$.

4. A compound represented by a free acid of the following formula, iso-propyl group, $W_1$ is a $C_2$ to $C_6$ straight alkylene group or a group of

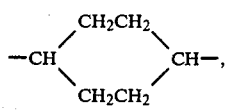

$Y_1$ is a fluorine or chlorine atom, l and m are independently a number of not less than 0 but not more than 3,

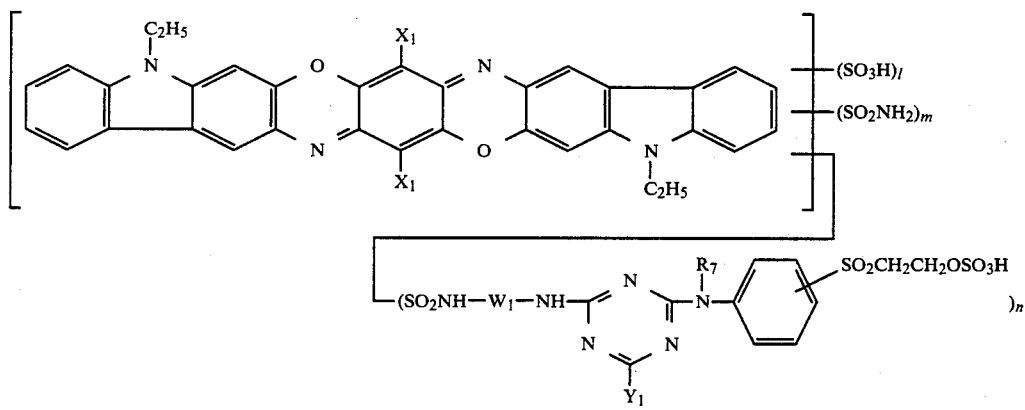

wherein $X_1$ is a hydrogen or halogen atom or a methyl, ethyl or cyano group, $R_7$ is a methyl, ethyl, 2-carbamoylethyl, 2-hydroxyethyl, 2-carboethyl or n- or and n is a number of more than 0 but not more than 3, provided that l, m and n satisfy $0 < l+m+n \leqq 4$.

* * * * *